United States Patent
Zabihi Naeini et al.

(10) Patent No.: US 9,234,976 B2
(45) Date of Patent: Jan. 12, 2016

(54) DEVICE AND METHOD FOR REMOVAL OF MULTIPLES FROM SEISMIC DATA VINTAGES

(71) Applicant: CGGVERITAS SERVICES SA, Massy (FR)

(72) Inventors: Ehsan Zabihi Naeini, Teddington (GB); Henning Hoeber, East Grinstead (GB)

(73) Assignee: CGGVERITAS SERVICES SA, Massy (FR)

( * ) Notice: Subject to any disclaimer, the term of this patent is extended or adjusted under 35 U.S.C. 154(b) by 380 days.

(21) Appl. No.: 13/739,107

(22) Filed: Jan. 11, 2013

(65) Prior Publication Data

US 2013/0182534 A1    Jul. 18, 2013

Related U.S. Application Data

(60) Provisional application No. 61/586,328, filed on Jan. 13, 2012.

(51) Int. Cl.
*G01G 1/38* (2006.01)
*G01V 1/38* (2006.01)
*G01V 1/36* (2006.01)

(52) U.S. Cl.
CPC *G01V 1/38* (2013.01); *G01V 1/364* (2013.01); *G01V 2210/56* (2013.01)

(58) Field of Classification Search
CPC ... G01V 1/282; G01V 2210/66; G01V 11/00; G06F 7/60
See application file for complete search history.

(56) References Cited

U.S. PATENT DOCUMENTS 6,662,147 B1 * 12/2003 Fournier et al. ............... 703/10

OTHER PUBLICATIONS

Zabihi Naeini, E., et al., "Simultaneous multi-vintage multi-parameter time lapse matching," 72nd EAGE Conference & Exhibition, Expanded Abstract, Barcelona, Spain, Jun. 14-17, 2010, B038.*
Fomel, S., "Adaptive multiple subtraction using regularized nonstationary regression," Geophysics, vol. 74, No. 1, Jan.-Feb. 2009, pp. V25-V33.
Guangkai, M., et al., "An improved adaptive multiple subtraction method," 79th SEG Annual International Meeting, Expanded Abstract, Houston Texas, Oct. 25-30, 2009, pp. 3163-3167.
Guitton, A., et al., "Adaptive subtraction of multiples using L1-norm" Geophysical Prospecting, 52, 2004, European Association of Geoscientists & Engineers, pp. 27-38.
Lu, W., "Adaptive multiple subtraction using independent component analysis," Geophysics, vol. 71, No. 5, Sep.-Oct. 2006, pp. S179-S184.
Verschuur, D. J., et al., "Estimation of multiple scattering by iterative inversion: Part II: Practical aspects and examples," Geophysics, vol. 62, No. 5, Sep.-Oct. 1997 pp. 1596-1611.
Wiggins, J. W., "Attenuation of complex water-bottom multiples by wave-equation-based prediction and subtraction," Geophysics, vol. 53, No. 12, Dec. 1988, pp. 1527-1539.
Zabihi Naeini, E., et al., "Simultaneous multi-vintage time shift estimation," Geophysics, vol. 74, No. 5, Sep.-Oct. 2009, pp. V109-V121.

* cited by examiner

*Primary Examiner* — Luke Ratcliffe
(74) *Attorney, Agent, or Firm* — Patent Portfolio Builders PLLC

(57) ABSTRACT

A method, an apparatus and a computer readable medium for generating an image of a subsurface based on seismic data corresponding to at least two different times, for a same surveyed area are provided. A cost function, which is a sum over the seismic data vintages of a norm of differences between data and model predicted multiples, is minimized subject to minimizing residual multiples that are differences of corresponding multiples belonging to different vintages among the seismic data vintages.

20 Claims, 9 Drawing Sheets

DEVICE AND METHOD FOR REMOVAL OF MULTIPLES FROM SEISMIC DATA VINTAGES

CROSS REFERENCE TO RELATED APPLICATIONS

This application claims priority and benefit from U.S. Provisional Patent Application No. 61/586,328 filed Jan. 13, 2012, for "Seismic processing technique for the elimination of multiple energy on time-lapse data," the entire contents of which is incorporated in its entirety herein by reference.

BACKGROUND

1. Technical Field

Embodiments of the subject matter disclosed herein generally relate to methods and systems for eliminating multiples from seismic data acquired at different times at the same location (4D seismic surveys), thereby achieving a clearer image of real changes occurring in time in the subsurface.

2. Discussion of the Background

A widely used technique for searching for oil or gas is the seismic exploration of subsurface (i.e., geophysical structure). The seismic exploration consists of generating seismic waves directed toward the subsurface, gathering data on reflections of the generated seismic waves at interfaces between layers of the subsurface, and analyzing the data to generate a profile (image) of the geophysical structure, i.e., the layers of the investigated subsurface. The seismic exploration is used both on land and for exploring the subsurface under the sea floor.

As illustrated in FIG. 1, during a marine seismic exploration, a vessel 10 tows an array of seismic receivers 12 provided on cables 14 that form streamers 16. The streamers may be disposed horizontally, i.e., lying at a constant depth Z1 relative to a surface 18 of the ocean. However, the streamers may also be towed slanted or bent. The vessel 10 also tows a seismic source assembly 20 that is configured to generate pressure waves (also known as seismic or acoustic waves), such as the wave 22a. The wave 22a propagates downward toward the sea floor 24 and penetrates the subsurface under the sea floor 24 until eventually reflecting (R) at an interface 26 between layers of the subsurface. The reflected wave 22b then propagates upward until it is detected by a receiver 12. The receiver 12 records data related to the reflected wave 22b (e.g., time of arrival relative to time when the wave 22a was generated, energy, etc). Data gathered by the multiple receivers 12 is then processed for generating an image of the geophysical structure under the sea floor 24 (i.e., the subsurface).

The signal recorded by a seismic receiver varies in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface. Waves other than primary waves are known as multiples.

For example, as illustrated in FIG. 2, a seismic source 30 produces a wave 32 that splits into a primary wave 34 penetrating inside the subsurface 25 under the sea floor 24, and a multiple wave 36 that travels back toward the sea surface 18. The primary wave 34 is reflected only once at an interface 26 between different layers in the subsurface 25 and travels back to a receiver R 40. The multiple wave 36 also reaches the receiver R 40 at a different time, after being reflected two more times: once at the surface 18 and a second time at the sea floor 24. Thus, as graphically illustrated in FIG. 3 (where the vertical axis represents time and the horizontal axis represents energy), a received signal includes a first energy peak 50 corresponding to the primary wave 34 and a second peak 60 corresponding to the multiple wave 36 that suffered multiple reflections. The columns 52 and 62 illustrate the layers traveled by the primary wave 34 and by the multiple wave 36, respectively, from the source to the receiver. Thus, the primary wave travels through water and a first layer, and it is reflected at an interface between the first layer and a second layer of the subsurface under the sea floor. The multiple wave 36 illustrated in FIGS. 2 and 3 travels only through water. However, other multiples may also travel through the subsurface.

A number of seismic processing methods are currently used to remove the multiples from the seismic data, for example: T-x domain predictive deconvolution, Tau-p deconvolution (linear RADON), parabolic RADON, 2D and 3D surface-related multiple elimination (SRME). Some of these methods consist of modeling multiple reflections in order to subtract (or adaptively subtract) them from seismic data and, thus, to keep only useful seismic data (i.e., the primary waves) to image the subsurface.

In "Attenuation of complex water-bottom multiples by wave-equation-based prediction and subtraction" (by Wiggins, J. W., published in 1988 in *Geophysics,* 53, 1527-1539) and in "Estimation of multiple scattering by iterative inversion: Part II: Practical aspects and examples" (by Verschuur et al., published in 1997 in *Geophysics,* 62, 1596-1611), the authors describe wave-equation-based multiple attenuation or data-driven surface-related multiple elimination methods. These methods consist of two steps: (1) multiple prediction followed by (2) adaptive subtraction. The multiple prediction may be model-driven or data-driven. The model-driven wave-equation multiple prediction requires knowledge about the near-surface water velocity model, the water bottom topography, and subsurface velocities. Data-driven surface-related multiple prediction requires that the source and receiver are co-located, the source signatures are consistent, and that the near offset traces are not missing, as described in "An improved adaptive multiple subtraction method" (by Guang-kai, M. et al, in 2009 in $79^{th}$ *SEG Annual International Meeting,* Expanded Abstract, 3163-3167). Furthermore, variations in the acquisition wavelet, cable feathering, boundary effect, and limited offset range can also introduce time shifts or amplitude artifacts into the predicted multiples. In practice, therefore, the predicted multiples need to be adapted to the data prior to subtraction.

Conventionally, in order to remove multiples from the acquired data, the following steps are executed:
 1. sorting the data into an optimal domain (e.g., receiver gather sorting)—subject to testing;
 2. predicting multiples with a given demultiple method—subject to testing; and
 3. adaptively subtracting one or more multiple models from the data in the domain—subject to testing.

After removing the multiples from the acquired data, the remaining peaks in the data are estimated primaries.

In reservoir surveillance, at least two seismic data vintages representing time-lapse seismic data for the same subsurface are gathered. It is desirable for the process of removing the multiples to be optimum for all seismic data vintages. The time-lapse acquisition of seismic data adds complexity to the problem of extracting multiples because the seismic data vintages are gathered potentially with different data acquisition configurations, different offset ranges and cable length, non-identical sources and departures from the ideal geometry (i.e., feathering), etc. Conventionally, in order to handle this complexity, adaptive non-stationary operators are designed to subtract the predicted multiples for each seismic data vintage individually. However, this approach neglects the key time-lapse product which is, of course, the 4D difference; that is, the real changes in the substructure that have occurred in the time interval(s) between the times when the seismic data vintages were acquired.

The complexity of extracting multiples increases factorially with the number of seismic data vintages. For example, with three seismic data vintages, there are six quantities (three seismic data vintages and three differences) to be optimized. For four seismic data vintages, there are ten quantities (four seismic data vintages and six differences) to be optimized. Similar problems arise in other areas of time-lapse processing, such as multi-vintage time shift estimation (as described in "Simultaneous multi-vintage time shift estimation" by Zabihi Naeini et al., published in 2009 in *Geophysics,* 74(5), V109-V121) or time-lapse residual matching (as described in "Simultaneous multi-vintage multi-parameter time lapse matching" by Zabihi Naeini et al., published in 2010 in $72^{nd}$ *EAGE Conference & Exhibition*, Expanded Abstract, B038).

When multiple seismic data vintages are analyzed, one (typically the first in time) is considered "base" and the other seismic data vintage(s), acquired later in time, are "monitor(s)." Conventionally, as illustrated in FIG. 4, each seismic data vintage is processed separately (the base at 410-420-430, monitor 1 at 440-450-460 and monitor N at 470-480-490) and independently to optimally remove the multiples in each data set (i.e., the base and each of the monitors separately), and the remaining estimated primaries are then compared to identify 4-D differences at 500. The purpose of analyzing multiple seismic data vintages is to identify the actual changes (e.g., due to exploitation of the reservoir) in the subsurface. These actual changes are essentially changes in the primaries. As illustrated in FIG. 5, conventional processing (e.g., separate processing of the base and the monitor) yields "leaky" differences between multiples 510, which are spurious effects that may obscure the real differences in the primaries. The leakage may appear because for both data sets (i.e., the base and the monitor), the adaptive subtraction may be suboptimal. This leaves residual (small) multiple energy in the data. The residual multiple energies for both data sets remain in the 4D difference because they are different (i.e., not the same residual multiple energy).

As illustrated in FIG. 5, although there were no substantive changes in the estimated primaries between the base and the monitor, there appear to be some changes due to the "leaky" subtraction of the multiples.

Thus, a method optimizing simultaneously (1) extracting predicted multiples from all the time-lapse vintages and (2) minimizing the 4D differences between corresponding multiples of different seismic data vintages is desirable.

SUMMARY

Various embodiments yield an enhanced image of actual changes of subsurface under the sea floor, by analyzing seismic data vintages acquired at different times and surveying the same subsurface, avoiding residual multiple energies for the vintages to remain in the 4D difference by performing the adaptive subtraction such as to reduce this type of leakage.

According to an exemplary embodiment, there is a method for generating an image of a subsurface based on seismic data. The method includes collecting seismic data vintages corresponding to at least two different times, for a same surveyed area. The method further includes minimizing a cost function which is a sum over the seismic data vintages of a norm of differences between data and model predicted multiples, subject to minimizing residual multiples that are differences of corresponding multiples belonging to different vintages among the seismic data vintages.

According to another exemplary embodiment, there is a computer-readable medium non-transitory storing executable codes that when executed on a computer make the computer perform a method for generating an image of a subsurface based on seismic data. The method includes collecting seismic data vintages, corresponding to at least two different times, for a same surveyed area. The method further includes minimizing a cost function which is a sum over the seismic data vintages of a norm of differences between data and model predicted multiples, subject to minimizing residual multiples that are differences of corresponding multiples belonging to different vintages among the seismic data vintages.

According to another exemplary embodiment, there is a seismic data analysis apparatus including a data input interface and a data processing unit. The data input interface is configured to collect seismic data vintages, corresponding to at least two different times, for a same surveyed area. The data processing unit is configured to minimize a cost function, which is a sum over the seismic data vintages of a norm of differences between data and model predicted multiples, subject to minimizing residual multiples that are differences of corresponding multiples belonging to different vintages among the seismic data vintages.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
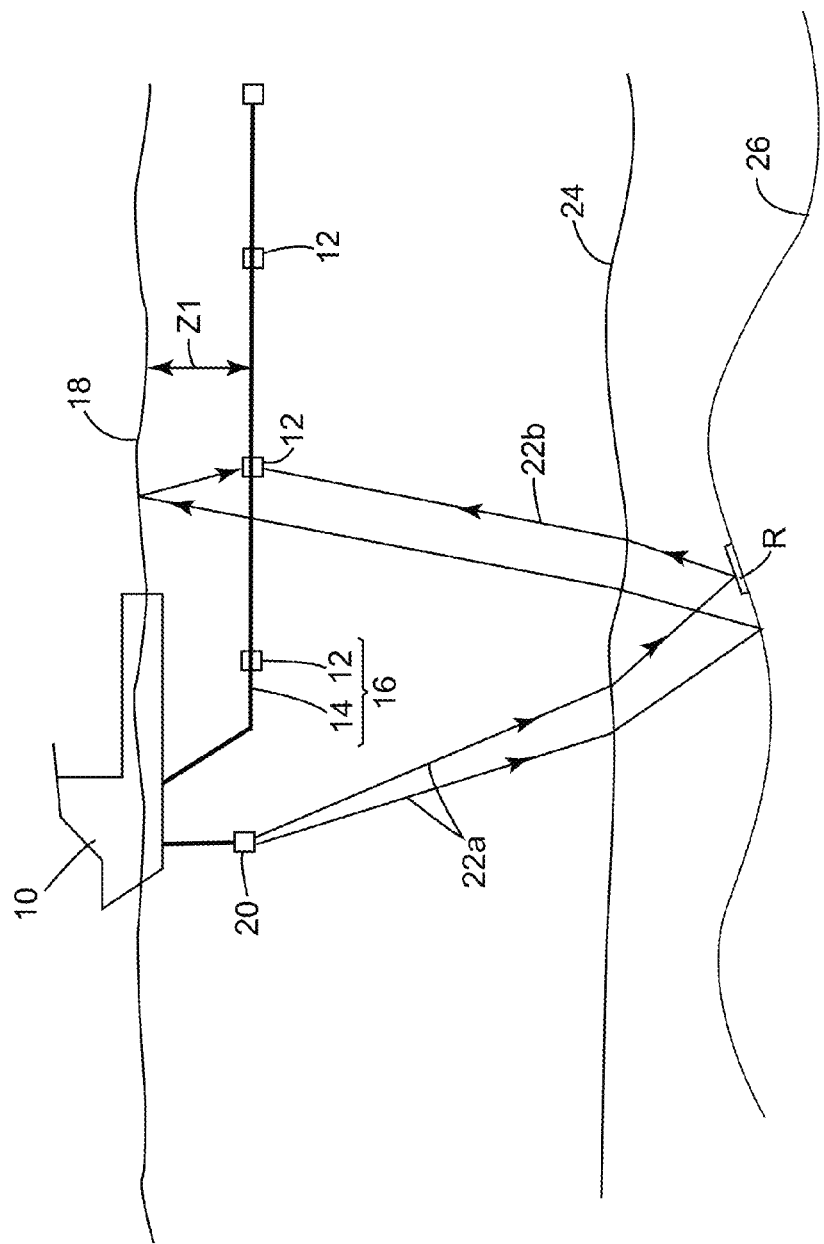
FIG. 1 is a schematic diagram of a seismic data acquisition setup.

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, for two seismic data vintages. However, the embodiments to be discussed next are not limited to only two vintages or to seismic data, but may be applied to plural seismic data vintages and to other similar data, such as electromagnetic data related to electromagnetic waves reflected by interfaces between layers of the subsurface.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Conventionally, for each seismic data vintage, adapting and subtracting the predicted multiples from data is achieved by minimizing a cost function as $$\|W(d-mf)\|_p^p \to \min \tag{1}$$

where m is the multiple convolution matrix (i.e., a multiple model), f is an adaptive operator or shaping filter, d is the data, and W is a weighting matrix which makes it possible to flexibly choose an appropriate norm, p, in an iterative least-square algorithm. For adaptive multiple subtraction, a matching filter is estimated to shape the predicted multiples to approximate the true multiples. The L2-norm method is widely used for matching the filter, assuming that the primaries have minimum energy. Using the L2-norm has some shortcomings, as discussed in "Adaptive subtraction of multiples using L1-norm" by Guitton, A. and Verschuur, D. J., published in 2004 in *Geophysical Prospecting*, 52, 27-38. For example, if the multiples and the primaries are not orthogonal, primaries do not have a minimum energy in the L2-norm sense, and there may be a strong primary in the original data that can be missed. To alleviate these problems, the L1-norm or hybrid norms may be used. Thus, p indicates that the norm used for the cost function may be an L2-norm, an L1-norm or a hybrid norm. However, these alternatives types of norms are exemplary and not intended to be limiting.

There are many reasons for multiples belonging to different seismic data vintages to be different, in particular, due to changes in the source and receiver locations, changes in the water layer and variations in the acquisition wavelet. The conventional approach in the removal of multiples, such as finding the optimal multiple subtraction operators independently on each seismic data vintage to obtain the smallest energy leakage on all applicable time-lapse difference sections, is notoriously difficult.

According to one exemplary embodiment, the steps of adapting and subtracting the predicted multiples are performed over all the seismic data vintages simultaneously such that a cost function (CF) is to be minimized:

$$CF = \sum_{i=1}^{No.\ Vintages} \|W_i(d_i - m_i f_i)\|_p^p \to \min \tag{2}$$

subject to minimal residual of the multiples from the 4D difference $$\sum_{i=1}^{(No.\ Vintages-1)} \sum_{j=i+1}^{No.\ Vintages} \|\text{residual multiple}\|_q^q \to \min \tag{3}$$

where q is the norm for the constraints. The norm p used for subtracting the predicted multiples and the norm q for the constraints may be the same or different and may be any one of an L2-norm, an L1-norm or a hybrid norm, or any other norm (e.g., curvelet domain subtraction). A residual multiple is a difference between corresponding multiples that belong to different seismic data vintages i and j:

$$\text{residual multiple} = \text{mult}_i - \text{mult}_j \tag{4}$$

Figure 2:
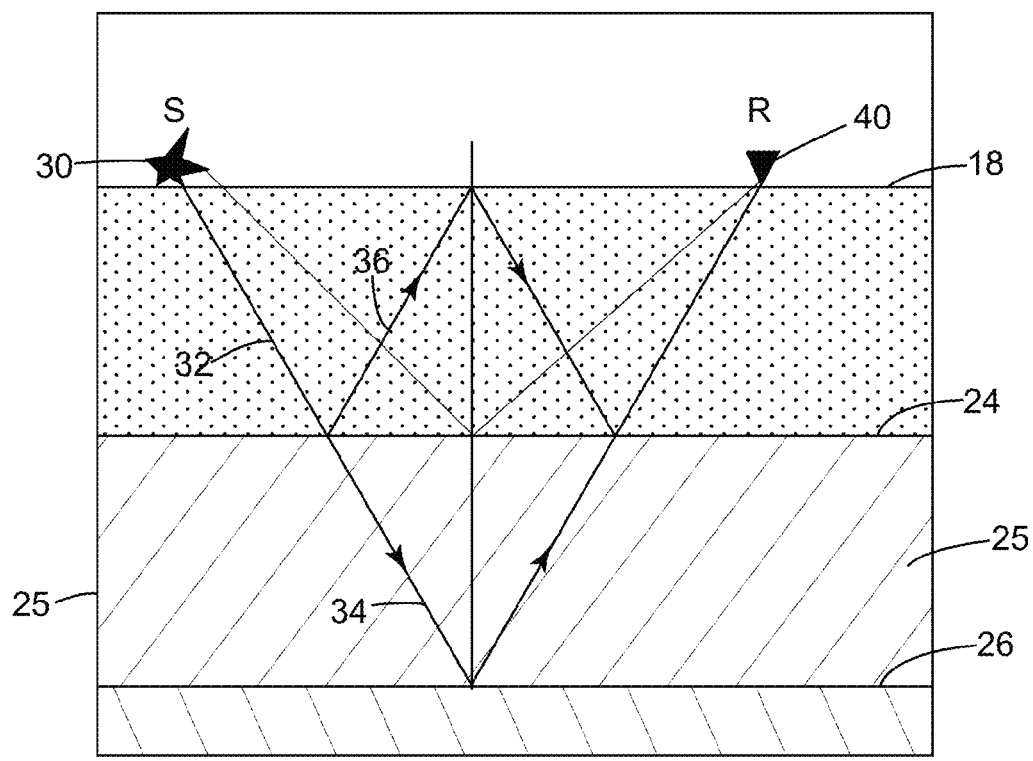
FIG. 2 is a diagram illustrating a primary signal and a multiple reflection multiple signal detected at a receiver.
Figure 3:
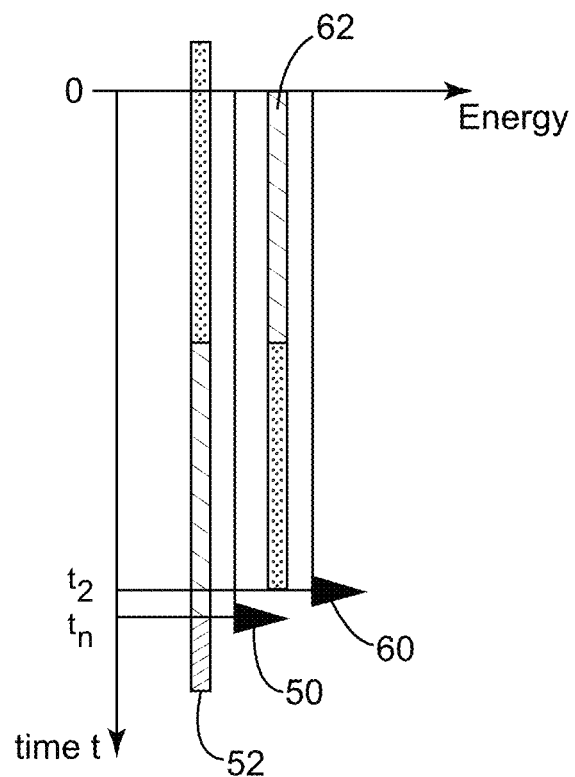
FIG. 3 is a time versus energy graph illustrating a primary signal and a multiple reflection multiple signal.
Figure 4:
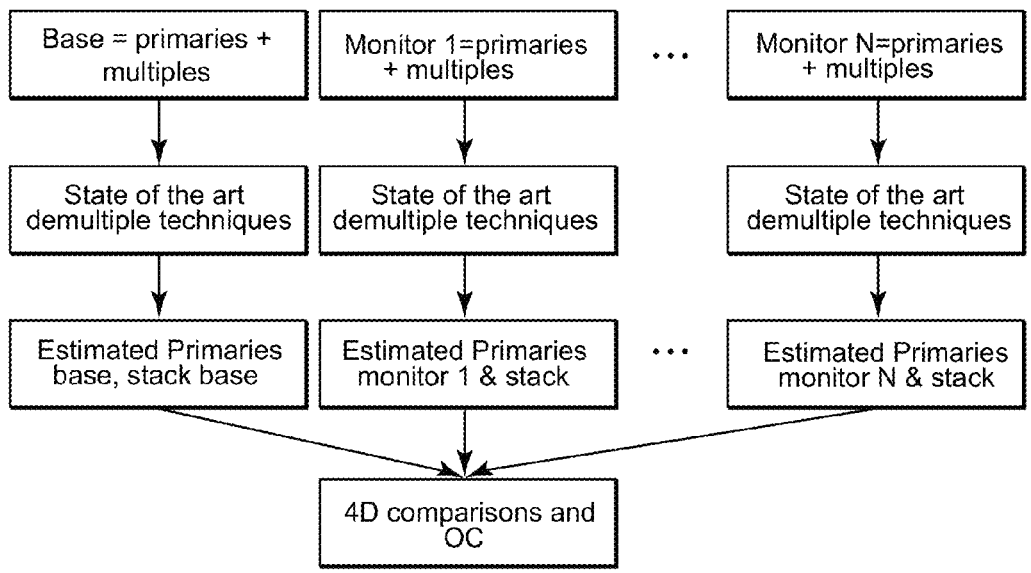
FIG. 4 is a block diagram illustrating a conventional method of analyzing multiple seismic data vintages.
Figure 5:
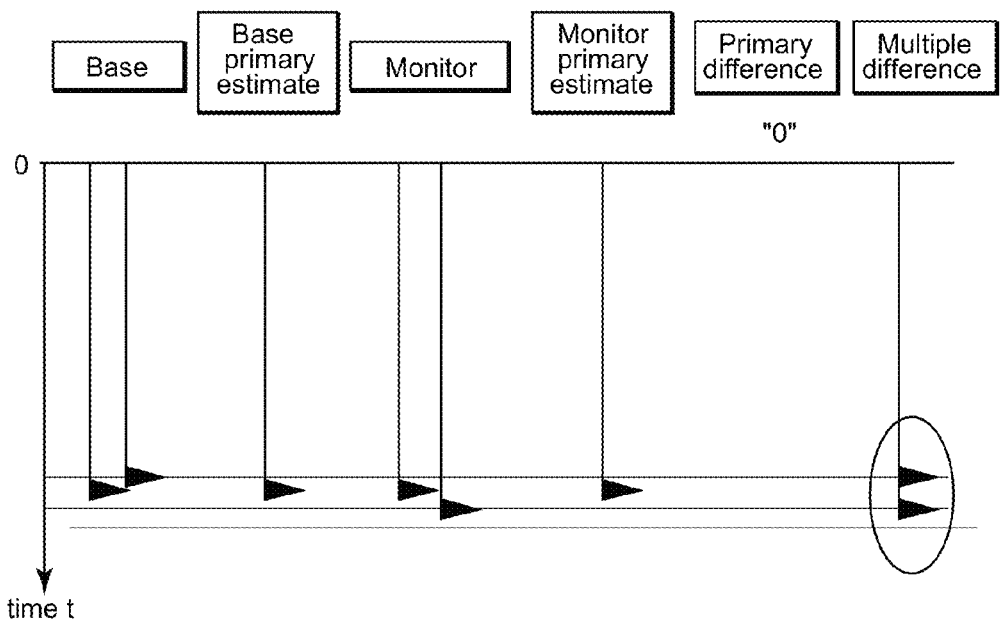
FIG. 5 is a time versus energy graph illustrating a deficiency of the conventional methods.

For example, referring back to the multiple wave 36 in FIG. 2, a similar multiple wave may be recorded in two seismic data vintages, but they are not exactly the same due to slightly changed conditions, so when subtracted there is a non-zero residual of these multiples that correspond to the same sequence of reflections. In equation (4) the index i indicates one (first) seismic data vintage and the index j indicates another (second) seismic data vintage (which is different from the first seismic data vintage).

In other words, the inputs to the data processing are the data and the multiple models for all vintages. A user parameter, lambda, controls how much the adaptive subtraction is coupled (i.e., zero means not at all and do everything as in the conventional data processing). The outputs of the data processing are filters to be applied to the input multiple models. The adapted multiple models which are actually subtracted are obtained when the filters are applied to the multiple models. This method then also yields the final primary models for all vintages. It is also possible to create primary models upfront (for example, from an independent adaptive subtraction on each vintage); these may also be incorporated in an adaptive simultaneous subtraction scheme.

Figure 6:
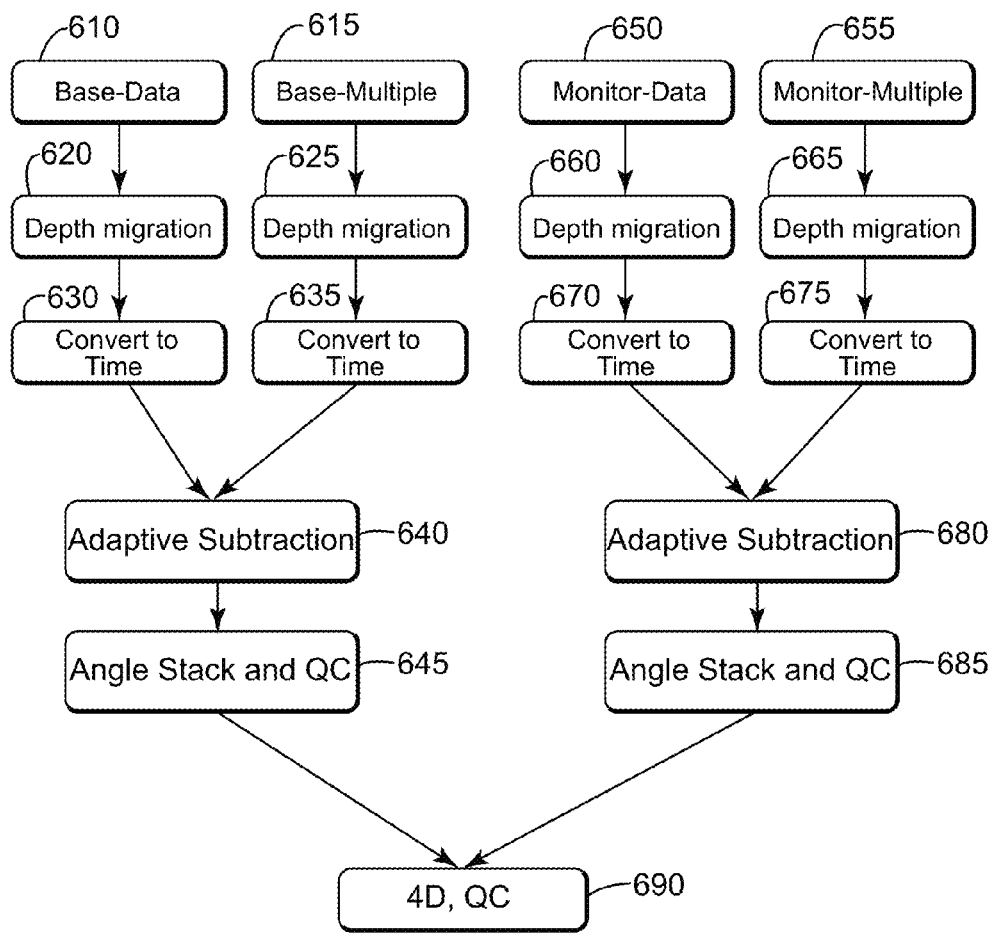
FIG. 6 illustrates a conventional workflow for analyzing two seismic data vintages.
Figure 7:
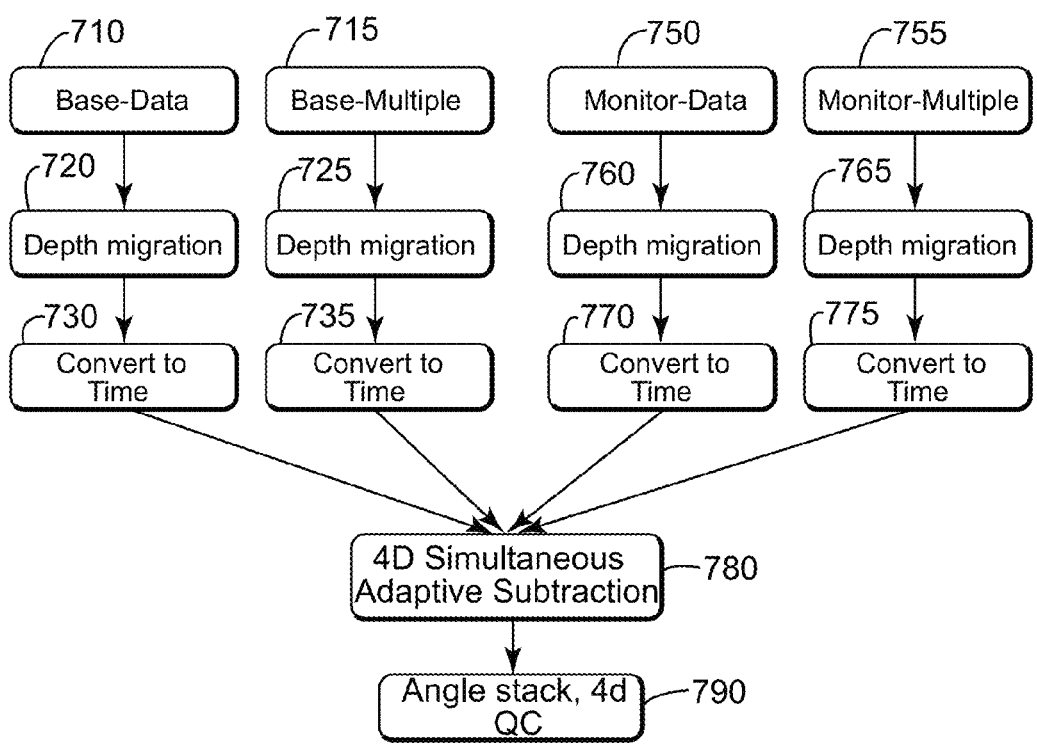
FIG. 7 illustrates a workflow for analyzing two seismic data vintages (base and monitor) according to an exemplary embodiment.

For illustrating the differences between the conventional methods and embodiments of the above-described method, a conventional workflow for analyzing two seismic data vintages (base and monitor) is illustrated in FIG. 6. A workflow for analyzing two seismic data vintages (base and monitor) according to an exemplary embodiment is illustrated in FIG. 7.

After depth migrating and converting to time the base data (610-630) and the predicted (raw) base multiples (615-635), adaptive subtraction of multiples is performed for the base data and the base multiples at 640, followed by angle stack and quality control (QC) at 645. The migration can be either time-migration or depth migration; if the migration is a simple time-migration, converting back to time is no longer necessary.

At 645, QC is used generically and may represent different ways of inspecting the data, for example, stacking only part of it or separating it in frequency bands, etc.

Similarly, after depth migrating and converting to time the monitor data (650-670) and the predicted (raw) monitor multiples (655-675), adaptive subtraction of multiples is performed for the monitor data and the monitor multiples at 680, followed by angle stack and QC at 685. As previously mentioned, the migration can be a simple time-migration (instead of depth migration), in which case, converting back to time is no longer necessary.

After 645 and 685, the remaining quantities corresponding to the base seismic data vintage and to the monitor seismic data vintage are compared at 690 to obtain images of actual changes in the subsurface.

In contrast, according to an exemplary embodiment illustrated in FIG. 7, after depth migrating and converting to time the base data (710-730), the base multiples (715-735), the monitor data (750-770) and the monitor multiples (755-775), a 4D adaptive subtraction is performed simultaneously on all the vintages while minimizing the cost function and the residual multiples thereof at 780. The angle stacking and observing the actual qualitative changes (QC) follow at 790.

The method mathematically expressed by equations (2)-(4) may be used in 1D, 2D, 3D or multi-dimensions and may be calculated/applied in time domain (t–x), frequency domain (f–x), tau-p or any other appropriate domain, as necessary. The method is also applicable to pre-imaging or post-imaging multiple subtraction. That is, seismic data (the energy and timing of the reflection in the subsurface) are recorded at an "arbitrary" location on the surface (as the receiver travels through the water being towed behind a vessel). The energy is generally not in the correct location (because we do not know how the energy propagates once in the earth). The process of "imaging" moves ("migrates") the data to the correct location and this then gives a true image of the subsurface (as if you were standing in front of the rock surface). As discussed before, the multiple model can be derived from different methods, either data-driven (SRME, tau-p deconvolution) or model-driven (wave-equation extrapolation). Various migration methods may be applied, the embodiments not being limited by the use of a specific migration method.

One of the advantages of some embodiments is that an optimized solution for the multiple subtraction is achieved in each seismic data vintage, and simultaneously, the residual multiple leakage in the 4D difference is minimized.

In one embodiment, equations (2) and (3) may be combined in a single function:

$$\sum_{i=1}^{No.\ Vintages} \|W_i(d_i - m_i f_i)\|_p^p + \lambda \sum_{i=1}^{(No.\ Vintages-1)} \sum_{j=i+1}^{No.\ Vintages} \|\text{residual multiple}\|_q^q \to \min \quad (5)$$

where λ stands for Langrange multipliers. The second term in this function is designed to match the multiple models prior to subtraction. This term should lead to less multiple leakage on the 4D differences. This technique is valid for an arbitrary number of seismic data vintages.

In other words, the above-described methods may be used for subtraction of multiples from an arbitrary number (≥2) of seismic data vintages, where multiple models can be predicted using various algorithms (e.g., data-driven or model-driven).

Figure 8:
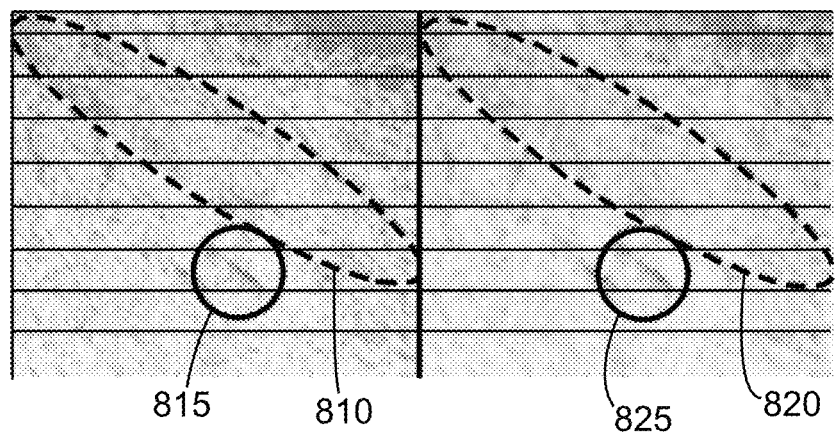
FIG. 8 is a comparison between a 4D difference obtained using conventional processing (left) and a 4D difference obtained using the method according to an exemplary embodiment (right)

The same approach may be used for multi-vintage noise attenuation, in particular coherent noise attenuation (of which demultiple is an example). To illustrate the improvement in attenuating residual multiples, a comparison is illustrated in FIG. 8 where on the left side it is the 4D difference obtained using conventional processing and the right side is the 4D difference obtained using the novel method according to an exemplary embodiment. The portions 810 and 820 surrounded by dashed lines correspond to an area where a significant decrease of 4D residual is obtained, while the circled portions 815 and 825 correspond to areas where an actual change is observed.

Figure 9:
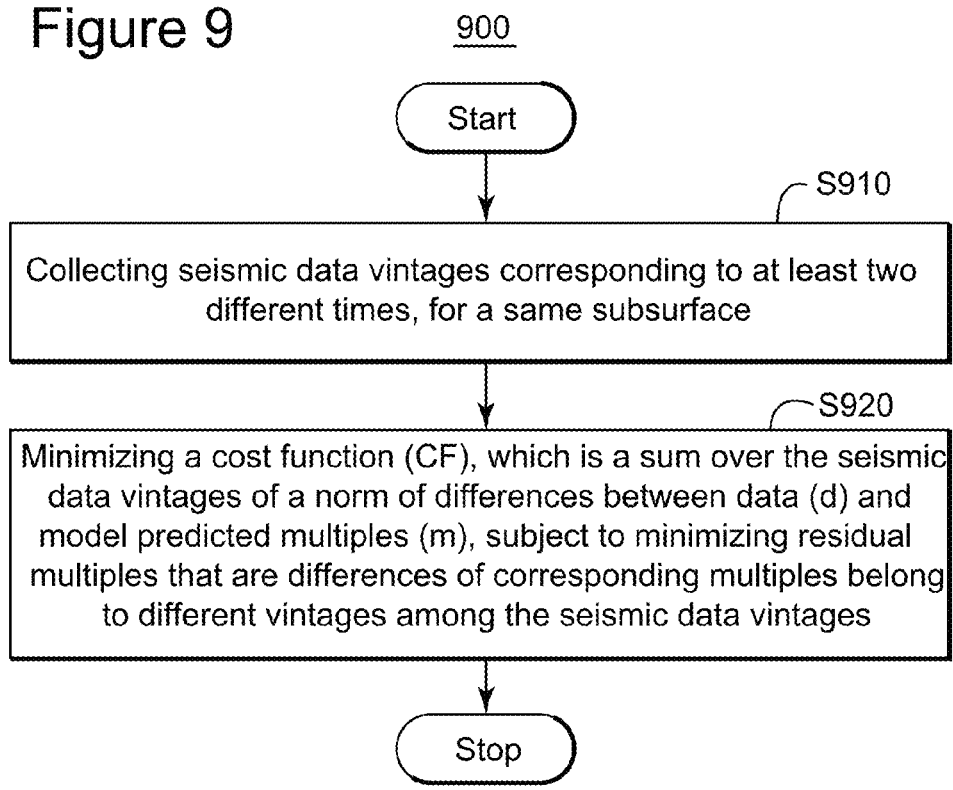
FIG. 9 is a flow diagram of a method for generating an image of a subsurface based on seismic data, according to an exemplary embodiment.

A flow diagram of a method 900 for generating an image of a subsurface based on seismic data is illustrated in FIG. 9. The method 900 includes collecting seismic data vintages corresponding to at least two different times, for a same surveyed subsurface, at S910. The collecting may refer to retrieving the data from a memory or a remote computer-readable media. The collecting may also include compiling the data of different seismic data vintages to a common format and/or applying corrections related to data acquisition conditions as deemed necessary. Ultimately, the collecting results in making available the data in a form suitable for the next step.

The method 900 further includes minimizing a cost function, which is a sum over the seismic data vintages of a norm of differences between data and model predicted multiples, subject to minimizing residual multiples that are differences of corresponding multiples belonging to different vintages among the seismic data vintages, at S920. The method may be applied to perform simultaneously de-noising and de-convolution of the data.

Here, a seismic data vintage is a set of data corresponding to signals acquired by receivers towed behind a towing vessel surveying a predetermined area, the signals being correlated to pressure waves generated by a seismic source (that may be similarly towed by the towing vessel). For example, the data may be collected by a seismic data acquisition setup as illustrated in FIG. 1, but the illustrated setup is exemplary, not limiting.

Figure 10:
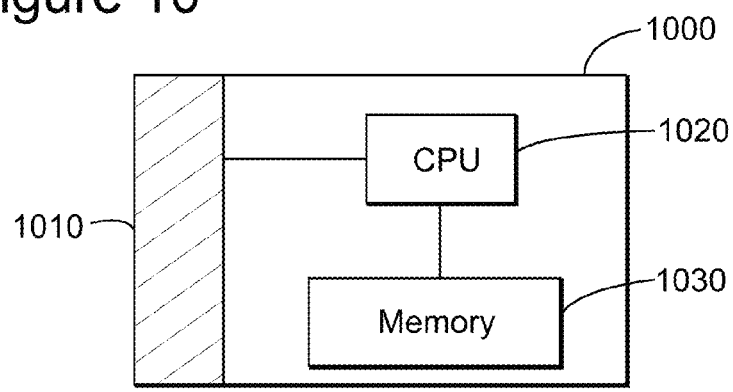
FIG. 10 is a block diagram of a seismic data analysis apparatus according to another exemplary embodiment.

The method 900 may be executed by a seismic data analysis apparatus 1000 whose schematic diagram is illustrated in FIG. 10. The seismic data analysis apparatus 1000 includes a data input interface 1010 configured to collect seismic data vintages, corresponding to at least two different times, for a same surveyed area. The seismic data analysis apparatus 1000 further includes a data processing unit 1020 configured to minimize a cost function, which is a sum over the seismic data vintages of a norm of differences between data and model predicted multiples, subject to minimizing across the seismic data vintages of differences between corresponding multiples.

The data analysis apparatus 1000 may also include a memory 1030, which is a computer-readable medium non-transitory storing executable codes. When the stored executable codes are executed on the data processing unit 1020 or another computer, the effect is making the data processing unit 1020 or the other computer perform a method for generating an image of a subsurface based on seismic data, such as (but not limited to) the method 900. Accordingly, the exemplary embodiments may take the form of an entirely hardware embodiment or an embodiment combining hardware and software aspects. Thus, exemplary embodiments may take the form of a computer program product (i.e., executable codes) stored on a computer-readable storage medium having computer-readable instructions embodied in the medium. Any suitable computer-readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The disclosed exemplary embodiments provide a method, an apparatus and a computer-readable medium for generating an image of a subsurface based on seismic data, while minimizing a cost function (which is a sum over the seismic data vintages of a norm of differences between data and model predicted multiples) subject to minimizing across the seismic data vintages of differences between corresponding multiples. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

Figure 11:
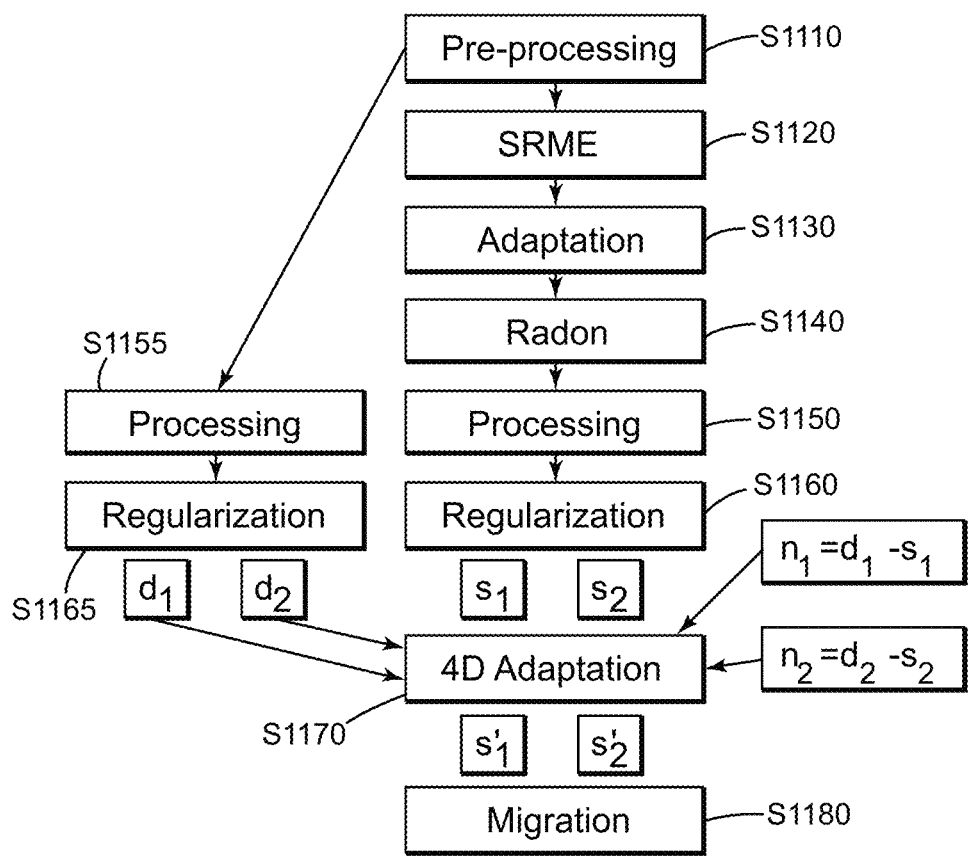
FIG. 11 is a flow diagram of another method for processing seismic data.

A similar method is illustrated in FIG. 11. The 4D processing of the data proceeds in a known manner, but simultaneously additional coherent noise adaptation and subtraction are performed for all processed vintages (only two vintages are tracked in FIG. 11, but the method may be used for more than two vintages). The seismic data is processed for each vintage (i) while applying as many noise attenuation methods as possible and/or required (e.g., S1110-S1160) to obtain signal models ($s_i$).

Prior to the imaging, for every acquisition vintage (i), the signal models ($s_i$) are subtracted from the respective data ($d_i$) (i.e., data before applying noise attenuation methods, after applying only S1155 and S1165 that are similar to S1150 and S1160) to obtain noise models ($n_i$), respectively:

$$n_i = d_i - s_i \qquad (6)$$

The noise models ($n_i$) contain noise originally removed from the data, (i.e., surface related multiples, internal multiples, and possibly any kind of coherent and predictable noise). Thus, a noise model ($n_i$) for a vintage (i) is adapted to its corresponding data ($d_i$) in an explicit manner as in the SRME case or in an implicit manner as in the Radon or deconvolution case.

A cost function (E) is then minimized (in 4D Adaptation at S1170) to derive filters ($f_i$) that simultaneously reshape the noise models for all vintages, where the 4D differences between vintages act as regularization constraints.

$$E = \sum_{i=1}^{N} \|d_i - f_i * n_i\| + \lambda \sum_{i=1}^{N-1} \sum_{j \neq i}^{N} \|(d_i - d_j) - (f_i * n_i - f_j * n_j)\| \qquad (7)$$

where (N) is the number of processed vintages and ($\lambda$) is a weighting parameter that controls the ratio between noise model matching and 4D differences. In this method, the filters ($f_i$) are no longer considered matching filters that, for example, harshly adapt SRME models to data, which can differ significantly in amplitude and character. These filters are now mild shaping filters that readjust the noise models to fit the data while honouring the repeatability of different vintages. The newly estimated signal models ($s_i'$), which are used for imaging (which is preceded by migration S1180), are:

$$s_i' = d_i - f_i * n_i. \qquad (8)$$

What is claimed is:

1. A method for generating an image of a subsurface based on seismic data vintages, the method comprising:
    collecting seismic data vintages corresponding to at least two different times, for a same subsurface;
    minimizing in a data processing unit a cost function (CF), which is a sum, over a number of the seismic data vintages, of a norm of differences between each seismic data vintage ($d_i$) and a corresponding model predicted multiples ($m_i f_i$), subject to minimizing residual multiples, wherein the residual multiples are differences of corresponding multiples belonging to different vintages among the seismic data vintages; and
    generating the image of the subsurface based on a result of minimizing the cost function (CF).

2. The method of claim 1, wherein the norm used in the cost function is one of an L2-norm, an L1-norm or a hybrid norm.

3. The method of claim 1, wherein the minimizing of the differences between corresponding multiples includes minimizing a sum over combinations of the seismic data vintages of a norm of the differences between corresponding multiples in different seismic data vintages, the norm of the differences between corresponding multiples in different seismic data vintages and the norm used in the cost function being each one of a L2-norm, a L1-norm or a hybrid norm.

4. The method of claim 1, wherein the model predicted multiples in a seismic data vintage (i) are obtained by multiplying a vintage specific model ($m_i$) with a vintage specific filter ($f_i$).

5. The method of claim 1, wherein, in the cost function, weight matrices ($W_i$) multiply differences between the seismic data vintages and the model predicted multiples for each seismic data vintage (i).

6. The method of claim 1, wherein the model predicted multiples are obtained using plural models and filters for each seismic data vintage.

7. The method of claim 1, wherein the minimizing of the cost function, subject to the minimizing across the seismic data vintages of the differences between the corresponding multiples is performed by minimizing a function that combines the cost function with the minimizing across seismic data vintages condition by using Lagrange multipliers ($\lambda$).

8. The method of claim 1, wherein models used to predict the multiples are data-driven models or model-driven models or a combination thereof.

9. The method of claim 1, further comprising:
    imaging differences between two of the seismic data vintages after correcting the seismic data vintages according to the minimizing.

10. The method of claim 1, wherein the minimizing of the cost function, subject to the minimizing across the seismic data vintages of the differences between the corresponding multiples is performed in time domain, frequency domain, or tau-p domain.

11. The method of claim 1, wherein the minimizing achieves de-noising and de-convolution of the data simultaneously.

12. The method of claim 1, wherein the CF to be minimized is $$CF = \sum_{i=1}^{No.\ Vintages} \|W_i(d_i - m_i f_i)\|_p^p \to \min$$

subject to minimal residual of the multiples from the 4D difference $$\sum_{i=1}^{(No.\ Vintages-1)} \sum_{j=i+1}^{No.\ Vintages} \|\text{residual multipld}\|_q^q \to \min$$

where q, a norm for the constraints and p the norm used for subtracting predicted multiples are any one of an L2-norm, an L1-norm or a hybrid norm.

13. A computer readable medium non-transitory storing executable codes that when executed on a computer make the computer perform a method for generating an image of a subsurface based on seismic data vintages, the method comprising:
   collecting seismic data vintages corresponding to at least two different times, for a same subsurface;
   minimizing a cost function, which is a sum, over a number i of the seismic data vintages, of a norm of differences between each seismic data vintage ($d_i$) and a corresponding model predicted multiples ($m_i f_i$), subject to minimizing residual multiples, wherein the residual multiples are differences of corresponding multiples belonging to different vintages among the seismic data vintages; and
   generating the image of the subsurface based on a result of minimizing the cost function.

14. A seismic data analysis apparatus, comprising:
   a data input interface configured to collect seismic data vintages corresponding to at least two different times, for a same surveyed area; and
   a data processing unit configured to,
   minimize a cost function, which is a sum, over a number i of the seismic data vintages, of a norm of differences between each seismic data vintage ($d_i$) and a corresponding model predicted multiples ($m_i f_i$), subject to minimizing residual multiples, wherein the residual multiples are differences of corresponding multiples belonging to different vintages among the seismic data vintages, and
   generate an image of the subsurface based on a result of minimizing the cost function.

15. The apparatus of claim 14, wherein the data processing unit is configured to minimize the differences between corresponding multiples across the seismic data vintages together with minimizing a sum over pairs among the seismic data vintages of a norm of the differences between corresponding multiples, the norm of the differences between corresponding multiples in different vintages and the norm used in the cost function being each one of a L2-norm, a L1-norm or a hybrid norm.

16. The apparatus of claim 14, wherein the data processing unit is configured to obtain the model predicted multiples by multiplying at least one model with at least one filter.

17. The apparatus of claim 14, wherein the data processing unit is configured to use weight matrices that multiply differences between the seismic data vintages and the model predicted multiples for each seismic data vintage in the cost function.

18. The apparatus of claim 14, wherein the data processing unit is configured to minimize the cost function and the differences between the corresponding multiples across the seismic data vintages by minimizing a function that combines using Lagrange multipliers the cost function and the differences between the corresponding multiples across the seismic data vintages.

19. The apparatus of claim 14, wherein the data processing unit is configured to minimize the CF $$CF = \sum_{i=1}^{No.\ Vintages} \|W_i(d_i - m_i f_i)\|_p^p \to \min$$

subject to minimal residual of the multiples from the 4D difference $$\sum_{i=1}^{(No.\ Vintages-1)} \sum_{j=i+1}^{No.\ Vintages} \|\text{residual multipld}\|_q^q \to \min$$

where q, a norm for the constraints and p the norm used for subtracting predicted multiples are any one of an L2-norm, an L1-norm or a hybrid norm.

20. The apparatus of claim 14, wherein the data processing unit is configured to achieve de-noising and de-convolution of the seismic data vintage simultaneously.

* * * * *